United States Patent [19]

Laflin et al.

[11] Patent Number: 5,705,995
[45] Date of Patent: Jan. 6, 1998

[54] SELECTIVE CALL RECEIVER AND METHOD OF STORING MESSAGES THEREIN

[75] Inventors: Timothy Cecil Laflin; Barbara Diaz Laflin, both of Ocean Ridge, Fla.

[73] Assignee: Motorola, Inc., Schaumburg, Ill.

[21] Appl. No.: 833,461

[22] Filed: Apr. 7, 1997

Related U.S. Application Data

[63] Continuation of Ser. No. 554,334, Nov. 6, 1995, abandoned.
[51] Int. Cl.⁶ .................. G08B 5/22; H04Q 7/00
[52] U.S. Cl. .................. 340/825.44; 340/825.26; 340/825.27; 340/825.47
[58] Field of Search .................. 340/825.26, 825.27, 340/825.44, 825.47

[56] References Cited

U.S. PATENT DOCUMENTS

| | | |
|---|---|---|
| 4,845,491 | 7/1989 | Fascenda et al. |
| 4,873,519 | 10/1989 | Matai et al. ........ 340/825.27 |
| 4,962,377 | 10/1990 | Wallace et al. |
| 5,075,684 | 12/1991 | DeLuca . |
| 5,241,305 | 8/1993 | Fascenda et al. ........ 340/825.44 |
| 5,374,925 | 12/1994 | Okhuma ........ 340/825.27 |
| 5,504,476 | 4/1996 | Marrs et al. ........ 340/825.47 |
| 5,535,428 | 7/1996 | King et al. ........ 340/825.27 |
| 5,543,781 | 8/1996 | Ganucheau, Jr. et al. ........ 340/825.27 |

Primary Examiner—Michael Horabik
Assistant Examiner—Edward Merz
Attorney, Agent, or Firm—John H. Moore

[57] ABSTRACT

A selective call receiver such as a pager (44) sorts and stores received messages (24-32) by categories and, optionally, by sub-categories as well. The category of a received message is determined by comparing a received message to identifying data (106) stored in the pager (44). Both the identifying data (106) and the categories can by changed by the user. When the category of a received message has been determined, a user alert is generated, the alert being indicative of the category of the message.

21 Claims, 14 Drawing Sheets

SELECTIVE CALL RECEIVER AND METHOD OF STORING MESSAGES THEREIN

This is a continuation, of application Ser. No. 08/554,334, filed Nov. 6, 1995, now abandoned.

FIELD OF THE INVENTION

This invention is generally directed to selective call receivers, including those known as pagers, and particularly to those receivers that are capable of receiving various kinds of messages via radio transmission.

BACKGROUND OF THE INVENTION

Selective call receivers are generally capable of receiving and decoding several types of messages. Some messages may be personal in nature, and others may be business related. Another type of message is sent by a so-called information service. This latter type of message may include sports information, stock market information, or any other type of information supplied by an information service.

Messages originating from information services are sent to pagers as follows. Each information service prepares a message that is to be sent to all of its subscribers. The information service sends that message to a paging terminal, usually via the public telephone service. The paging terminal then matches that message with a predetermined pager address, and transmits the message along with the address. Each pager which has subscribed to that information service will have that predetermined address stored in its memory, thereby permitting each such pager to receive and decode the accompanying message.

A problem which arises is that each pager needs a separate and dedicated address for each information service that it subscribes to. For example, a pager which is subscribed to four information services would need at least five separate addresses: one for each of the four information services and a fifth for other conventional paging messages (e.g., personal, business, etc.). As more paging users subscribe to more information services, the limited number of addresses available to a pager can be too quickly depleted. Some pagers are limited to as few as 4 addresses.

Another drawback that can arise with conventional pagers is the inability of the user to quickly retrieve, from among his received messages, a specific piece of information, such as a customer's telephone number mentioned in a message. If the user has received a large number of messages of various types, and he needs to retrieve the customer's telephone number from among those messages, it can take an undesireably long time to read through the messages to locate the desired information.

It is desirable, therefore, to provide a selective call receiver which avoids the problems mentioned above, and to do so without invoking large cost penalties, either for the system operator or for the user.

DESCRIPTION OF THE PREFERRED EMBODIMENT

Figure 1:
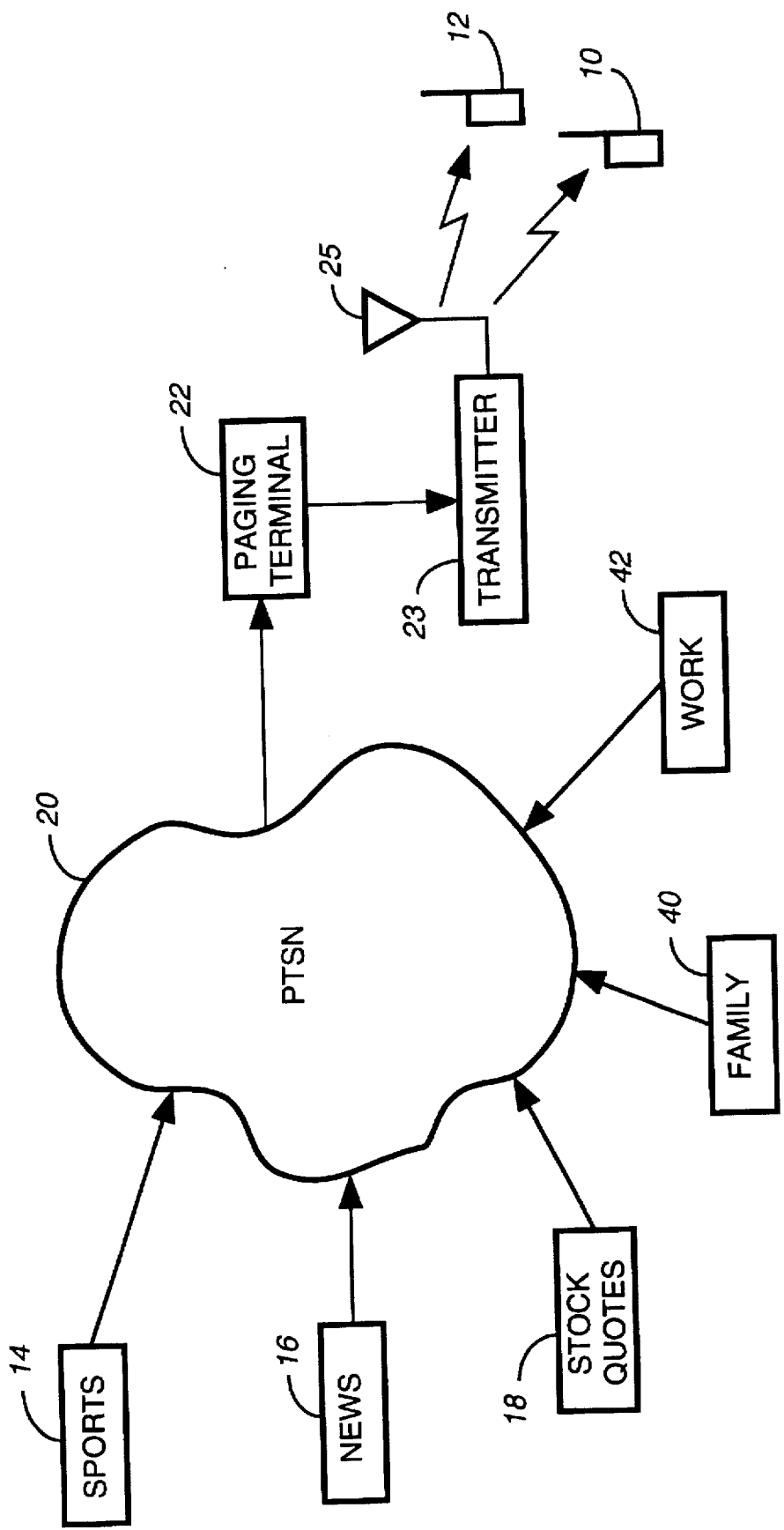
FIG. 1 is a block diagram of a paging system in which the invention is used.

Referring to FIG. 1, a system is shown in which selective call receivers, shown as pagers 10, 12, are intended to receive various categories of messages from various originators of messages. One such category is referred to herein as "information services", meaning information from a supplier (usually a commercial supplier) of information such as news, stock quotes, etc.

In FIG. 1, three information services are shown: Sports 14, News 16 and Stock Quotes 18. These three information services are merely exemplary of the various types of information services that are available.

Figure 2:
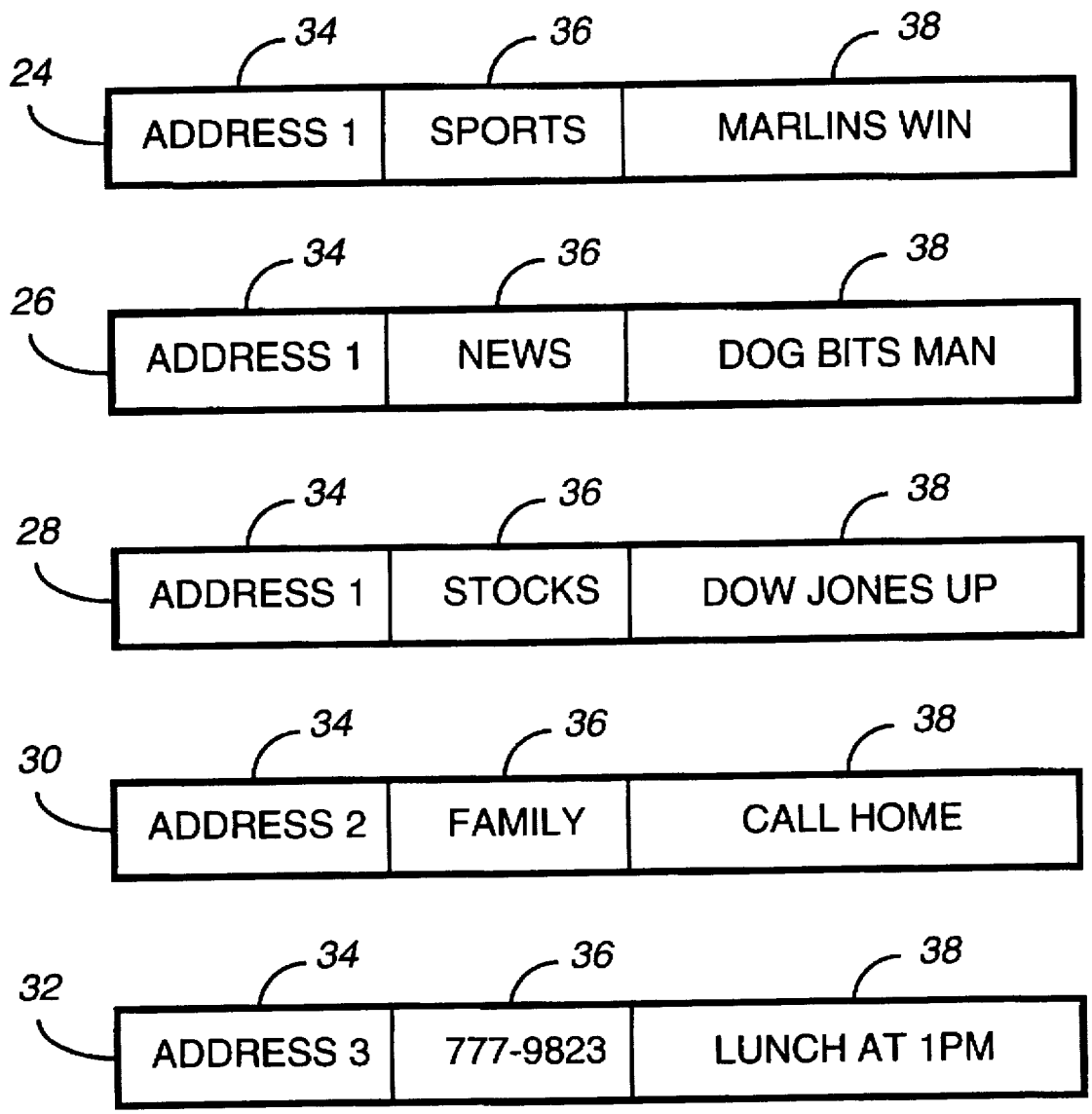
FIG. 2 illustrates the format of various messages that are transmitted in the system of FIG. 1.

The purpose of the information services 14, 16 and 18 is to send data to subscribing pagers. This occurs as follows. The information services typically use a Public Telephone Switch Network (PTSN) 20 to send their messages to a conventional paging terminal 22. The paging terminal 22 places the messages in a queue and prepares each message for transmission according to the desired paging protocol (e.g., POCSAG (Post Office Coding Standards Advisorary Group). An RF (Radio Frequency) transmitter 23 and an antenna 25 then transmit the prepared messages throughout the coverage area. The messages preferably are formatted as shown in FIG. 2.

Messages 24, 26, 28, 30 and 32 are shown in simplified form and as they would emanate from the paging terminal 22. It will be understood that each such message will actually include a preamble, synchronization bits, etc. that are normally part of the paging protocol being used, but such are not shown for sake of simplicity.

Referring to the message 24, it comprises data that includes an address portion 34, a header 36 that identifies the originator of the message, and a portion 38 that contains the information that is to be communicated to the subscriber.

The address portion 34 contains "address 1" which is a group address, typically a 32 bit word, for all pagers that subscribe to at least one of the information services offered in the system of FIG. 1. Thus, every pager that subscribes to either the Sports services 14, the News services 16, or the Stock Quotes 18 will have "address 1" stored in its memory and will respond to (but not necessarily decode) every message whose address portion 34 contains "address 1". Every pager having "address 1" responds by receiving every message whose address portion 34 contains "address 1", reading the header portion 36 of the same message. For reasons discussed later, only pagers that are subscribed to the Sports service 14 are able to decode the information in portion 38 of message 24.

The header portion 36 contains "Sports", indicating that the information to follow originated from the Sports service 14. Finally, portion 38 contains the sports information that is included in this message.

It should be noted that the header portion 36 may be put in the message 24 by either the originator of the message (in this case, the Sports service 14) or by the paging terminal 22 which can determine the originator of the message.

Referring to the messages 26 and 28, their address portions 34 both contain "address 1". Consequently, every pager having this address will respond to both these messages. The header portions 36 refer to "News" and "Stocks", indicating that the message 26 originated from the News service 16 and that the message 28 originated from the Stock Quotes service 18. Each message has its own information in portions 38.

Assume now that the pager 10 (FIG. 1) is subscribed to the Sports service 14 and to the News service 16, and that the pager 12 is subscribed only to the Stock Quotes service 18. In this event, both pagers would respond to all three messages, but the pager 10 would read (decode) portions 38 of messages 24 and 26, and would be unable to read portion 38 of message 28. The pager 12 would read portion 38 of the message 28, but would be unable to read portion 38 of messages 24 and 26.

FIG. 1 also shows other exemplary sources of messages that are not information services, such as family 40 and work 42. Obviously, there are many more such sources of messages which are not shown.

When family 40 sends a message to a pager, the format of that message may be as shown by message 30 in FIG. 2. In this case, the address portion 34 contains the unique address (shown as "address 2") of the one pager for which the message is intended. The header portion 36, shown as containing "family", is optional. It can be inserted by an operator at the paging terminal or by the originator who has access to a keyboard that is linked to the paging system. The information in the portion 38 will be received and read only by the pager having the address "address 2".

If the pager 10 has "address 2" as well as "address 1", then the pager 10 will respond to the messages 24, 26, 28 and 30, but it will read portions 38 of only messages 24, 26 and 30. It will not read portion 38 of message 28 because it is not subscribed to the Stocks service.

If the pager 12 has "address 3" (it also has "address 1"), and someone at work 42 sends the message 32 to "address 3", along with the telephone number of the originator in optional header portion 36 of message 32, then only the pager 12 will respond to the message 32 and will read the information in portion 38 of message 32.

Figure 3:
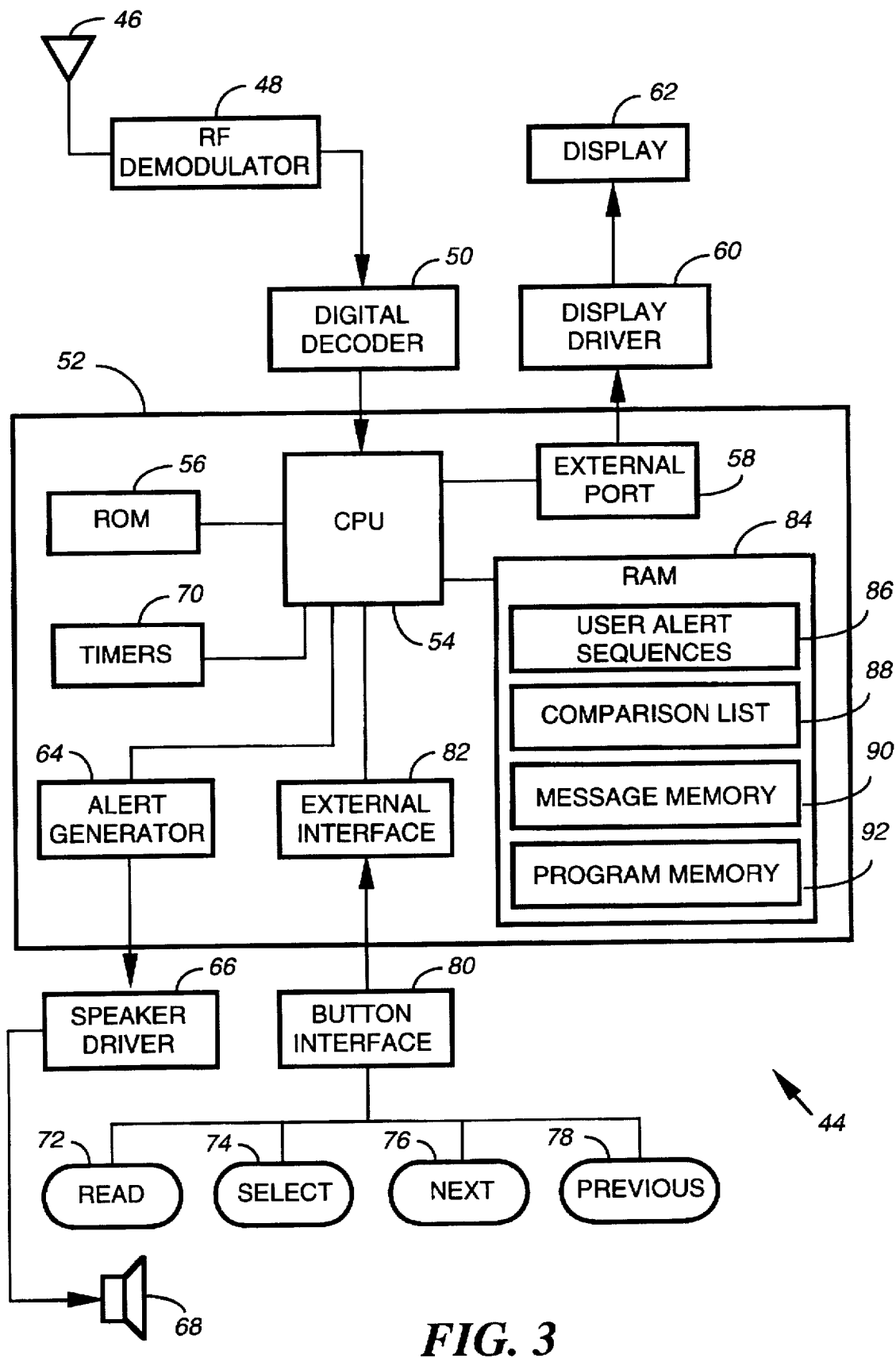
FIG. 3 is an electrical block diagram of a pager constructed in accordance with the invention.

A selective call receiver that operates according to the invention is shown in FIG. 3 as a pager 44. The illustrated pager has circuitry including an antenna 46, an RF demodulator 48 and a digital decoder 50, for receiving and decoding incoming messages that include data. Messages received by the antenna 46 are demodulated by the conventional demodulator 48 to provide demodulated analog data as an input to the decoder 50 which may also be of conventional construction.

The signal output from the decoder 50 is decoded digital data that is applied as an input to a processor 52 which may be, for example, a MC68HC05 made by Motorola, Inc. The processor 52 may also be conventional, but it is programmed to cause the pager 44 to operate according the invention, as discussed later.

The processor 52 includes a CPU (Central Processing Unit) 54 and a ROM (Read Only Memory) 56 which stores the instruction program for the CPU. The processor also includes an external port interface 58 for coupling signals from the CPU 54 to a display driver 60. The latter device drives a display 62, which may be a conventional liquid crystal display, for displaying decoded messages.

To generate a user alert upon receipt of a message, the CPU is coupled to an alert generator 64 whose output is coupled to the input of a speaker driver 66. A speaker 68 is coupled to the output of the driver 66 for generating an audible alert upon receipt of a message that is directed to the pager 44. As discussed more fully below, the pager 44 is capable of generating alerts having different characteristics, depending on which category a received message is in.

Timers 70 are coupled to the CPU 54 to give a time base for collecting data from the digital decoder (50) at precise intervals. They also keep time duration for alerts and possibly a real time clock for, the user interface.

To allow the user to control various functions of the pager, a user control is included. In the illustrated embodiment, the user control takes the form of user actuatable buttons entitled Read (72), Select (74), Next (76) and Previous (78) that are coupled to the CPU via a button interface 80 and an external port interface 82. The buttons may be used to cause a received message to be shown on the display 62 (by use of the read button 72), to scroll through messages using the buttons 76 and 78, and to exit reading messages using the select button 74. The use of these buttons to add to or alter the names of categories and identifying data is discussed in detail later.

The processor 52 also includes a RAM (Random Access Memory) 84 that comprises the following stored elements: user alert sequences 86, comparison list 88, message memory 90 and program memory 92.

The program memory 92 acts as a scratch pad memory for temporary storage or of new messages (before stored in message memory 90) or the results of computations made by the CPU 54.

The comparison list 88 and the message memory 90 contain information that is key to operating the pager 44 in accordance with one aspect of the invention. Broadly stated, this aspect of the invention involves a method of storing messages by first receiving incoming messages, providing a location in memory (e.g., in message memory 90) for storing the decoded messages according to categories, storing (such as in comparison list 88), for each such category, an associated list of identifying data, and comparing data in a decoded message to the stored identifying data. If a match is found, the decoded message is stored in memory under the category associated with the matching identifying data.

If no match is found for a message from an information service (because the pager is not subscribed to that service), the message is preferably discarded. If no match is found for a message from other sources (non information services), the message may be stored in a miscellaneous category.

Because the pager 44 receives different categories of messages, it is desirable to alert the user as to which category of message is being received. This is accomplished by making a characteristic of the alert be dependent on the category of the received message. For example, a message from work could have an audible alert consisting of a single, short tone, and a message from information services (such as Sports) could have an audible alert consisting of two short tones. Various combinations and sequences of tones can be used to indicate which category of message is being received. Alternately, the alert can be a visual stimulus created, for example, by flashing or otherwise highlighting portions of the message that match the identifying data. Information instructing the CPU as to which alert to select is stored in user alert sequences 86.

Figure 4:
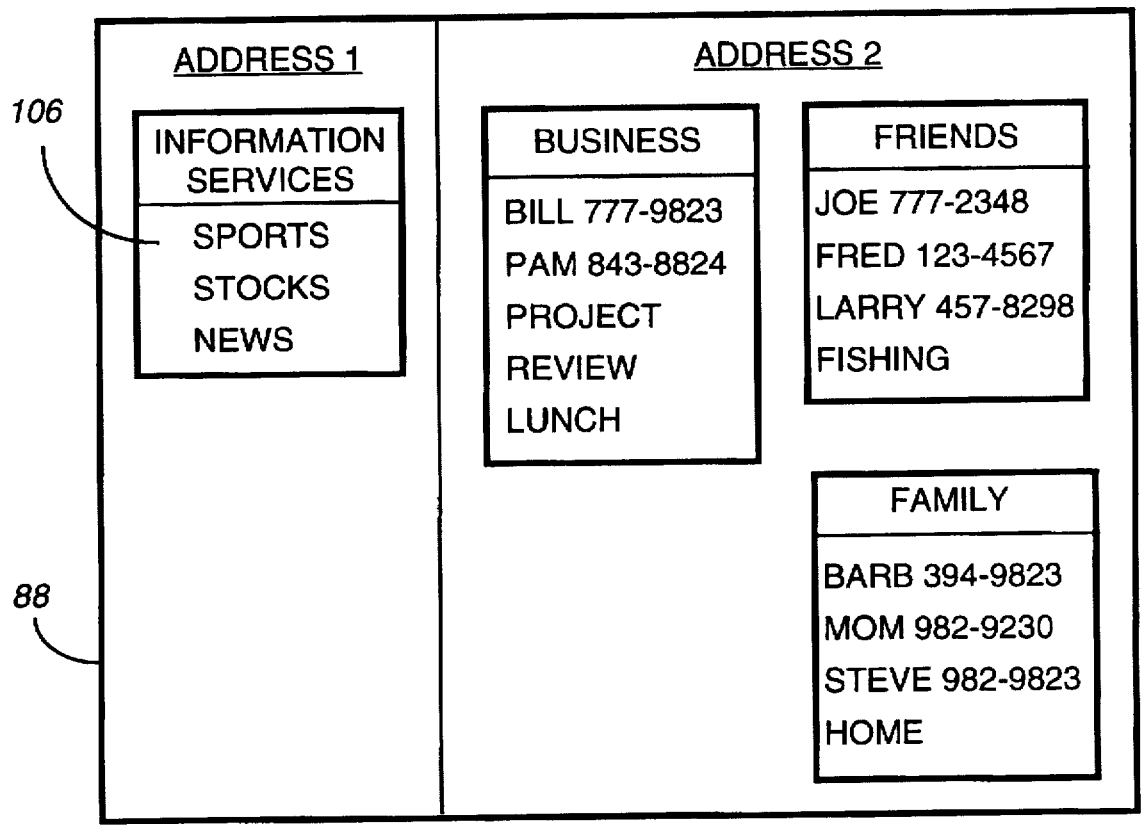
FIG. 4 illustrates a comparison list used by the pager of FIG. 3 to determine the category of a received message.

Referring now to FIG. 4, the comparison list 88 is shown in more detail. Preferably, the pager has stored in memory at least first and second addresses, shown as Address 1 and Address 2 (corresponding to Address 1 and Address 2 of FIG. 2). Additional addresses may be used if desired and if available.

Address 1 is for receiving messages in the information services category, and Address 2 is for receiving messages in at least a second, different category. In the illustrated embodiment, Address 2 is used for receiving messages in the categories of business, friends and family. In other words, any incoming message that is received with Address 1 is assumed to be in the information services category, and any incoming message that is received with Address 2 is assumed to be in the business, friends or family categories.

For at least one category, and preferably for each category, there is stored an associated list of identifying data. For the information services category, the identifying data is shown (FIG. 4) as sports, stocks and news. For the business category, the identifying data is the illustrated list of names and telephone numbers plus the words "project", "review" and "lunch". Other lists of identifying data are shown for the friends and family categories.

Figure 5:
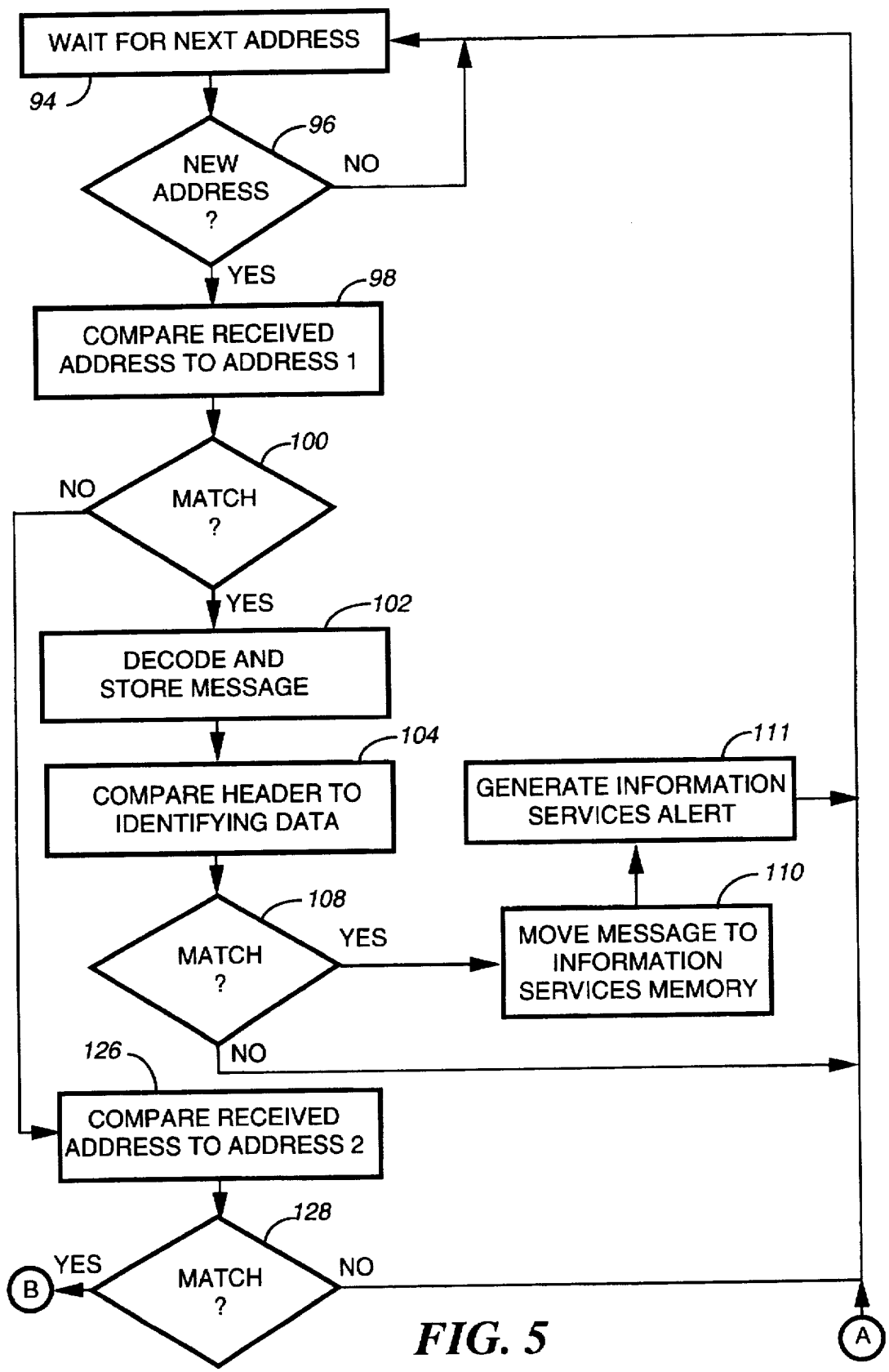
FIGS. 5 and 6 together are a flow chart showing how the pager's processor is programmed to identify various categories of messages.
Figure 6:
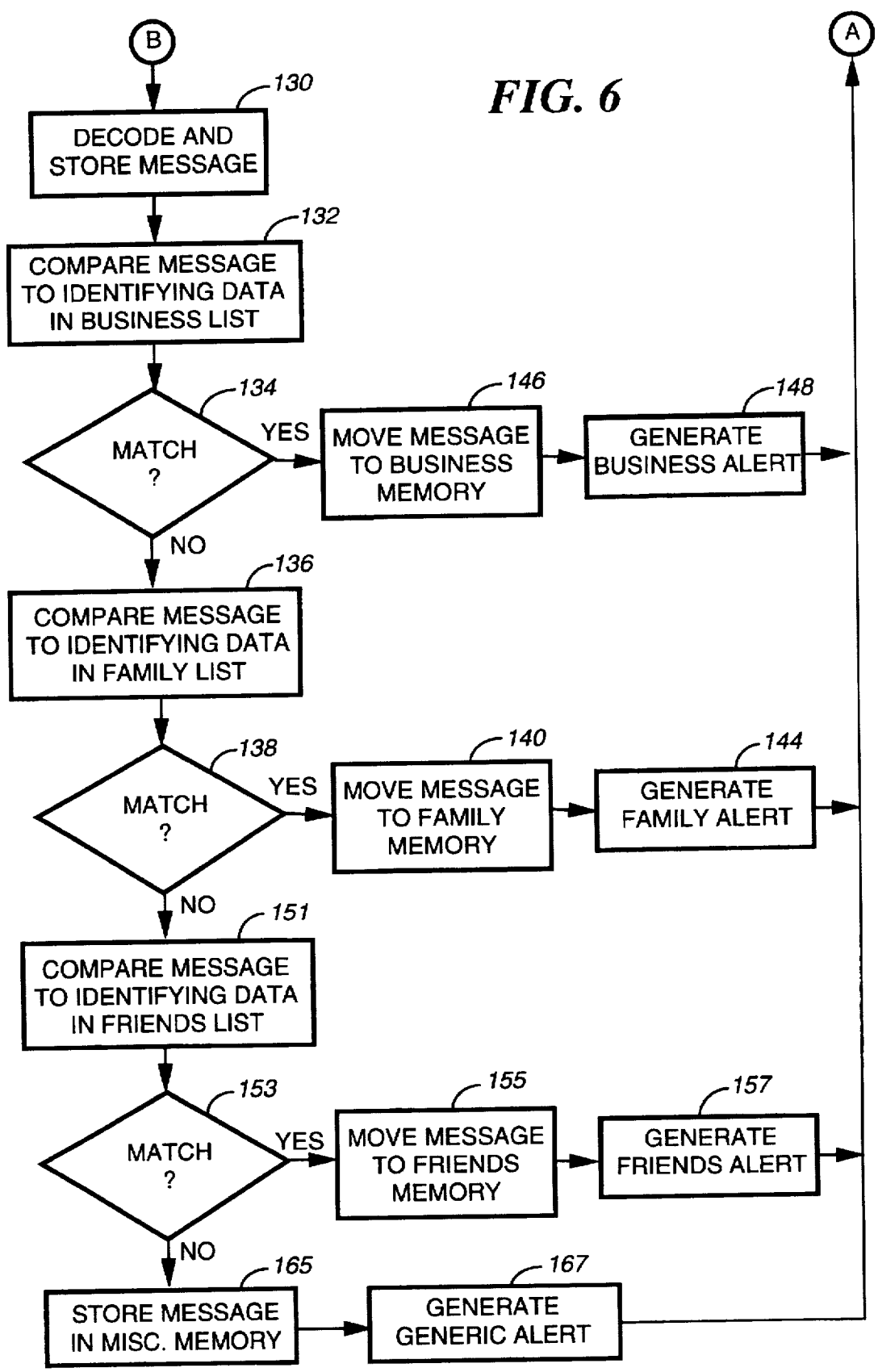

These addresses and lists of identifying data are used as follows. Referring to FIGS. 5 and 6, the illustrated flow chart indicates how the pager's processor is programmed to handle incoming messages. Assume that message 24 (FIG. 2) has been transmitted.

The first instruction 94 causes the pager to wait for the next incoming address. When a next address is received, instruction 96 asks whether it is a new address. If it is an address that has been recently received and found not to match an internally stored address, then the program returns to instruction 94. Otherwise, the program advances to the next instruction.

Instruction 98 causes the processor to compare the received address with Address 1. Because the message 24 includes Address 1, and because Address 1 is stored in memory as shown in FIG. 4, this comparison results in a match (instruction 100). At this point, the processor knows that the received message must be in the category of information services because that is the only category associated with Address 1 (FIG. 4).

Per the next instruction 102, the entire message is decoded and stored in a temporary memory such as in the program memory 92 (FIG. 3). Then instruction 104 causes the data in the header 36 (FIG. 2) to be compared to the identifying data that is stored in memory and associated with the information services category. Because "Sports" appears in the header 36, and at 106 in the identifying data under the information services category (FIG. 4), a match is found (instruction 108) and the program proceeds to instruction 110.

It should be noted that the entire message, not just the header (if any), can be compared to stored identifying data in looking for a match. For information services, however, it is desirable to include a header and to limit the comparison to data in the header to save processing time. For messages that are not information services, the header alone (if any), or all the data in the message, is examined for a match.

Returning to FIG. 5, the incoming message has been decoded and it has been determined that the message relates to sports under the information services category. Instruction 110 causes that message to be stored in message memory 90, and specifically in a memory location 112 reserved for "information services". See FIG. 7. The content of portion 38 of message 24 is stored at 113 within the information services category.

Referring again to FIG. 5, the program proceeds to instruction 111 which causes the pager to generate an audible alert and/or visual stimulus that signifies the receipt of a message in the information services category.

Figure 8:
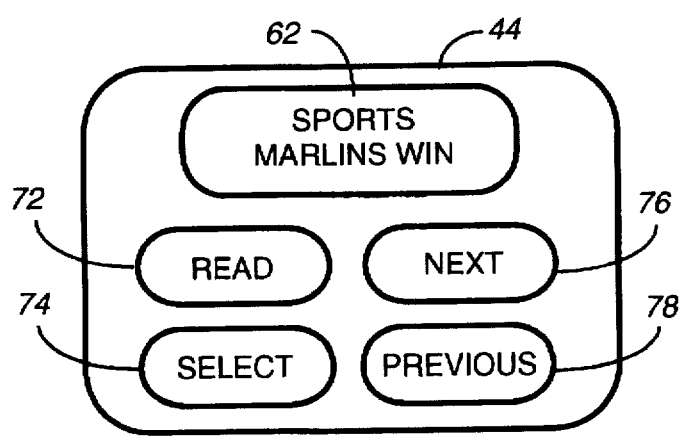
FIG. 8 is a front view of the pager shown in FIG. 3, showing the pager's display and various user actuatable buttons.

At this point, the user may elect to display and read the message. To do this, the user actuates the read button 72 (FIG. 3), and the pager 44 displays the message, and the message's category, on its display 62 as shown in FIG. 8.

Referring back to FIG. 7, the message memory 90 is shown as also having a location 114 for business messages, a location 116 for family messages, a location 118 for friends' messages and a location 120 for miscellaneous messages that are not in an identified category. Unused memory is designated as section 122 of the memory 90.

For the next example, assume that the message 28 (FIG. 2) has been sent. The execution of instructions 94–110 results in the processor finding a match between the data in the header 36 (Stocks) and the "Stocks" identifying data under the information services category (FIG. 4). The information contained in portion 38 of the message 28 is then stored in memory 90 (FIG. 7) under the information services category, as shown at 122. An appropriate alert is then generated by instruction 111, and the user may immediately (or later) display the received message.

Assume now that a message is transmitted that is not in the information services category, such as message 30 (FIG. 2). The program shown in FIG. 5 would be executed as before, but in this case no match would be found as a result of executing instruction 100. The program moves to instruction 126 to compare the address found in message 30 to "Address 2". Since a match is found (instruction 128), the program proceeds to instruction 130 (FIG. 6). The message is decoded and stored temporarily, after which instruction 132 causes the rest of the message, the contents of the header 36 and the portion 38, to be compared to the list of identifying data in the business category. Because the data "family" and "call home" are not among the identifying data in the business category, no match is found (instruction 134). Consequently, the program proceeds to instruction 136.

Figure 7:
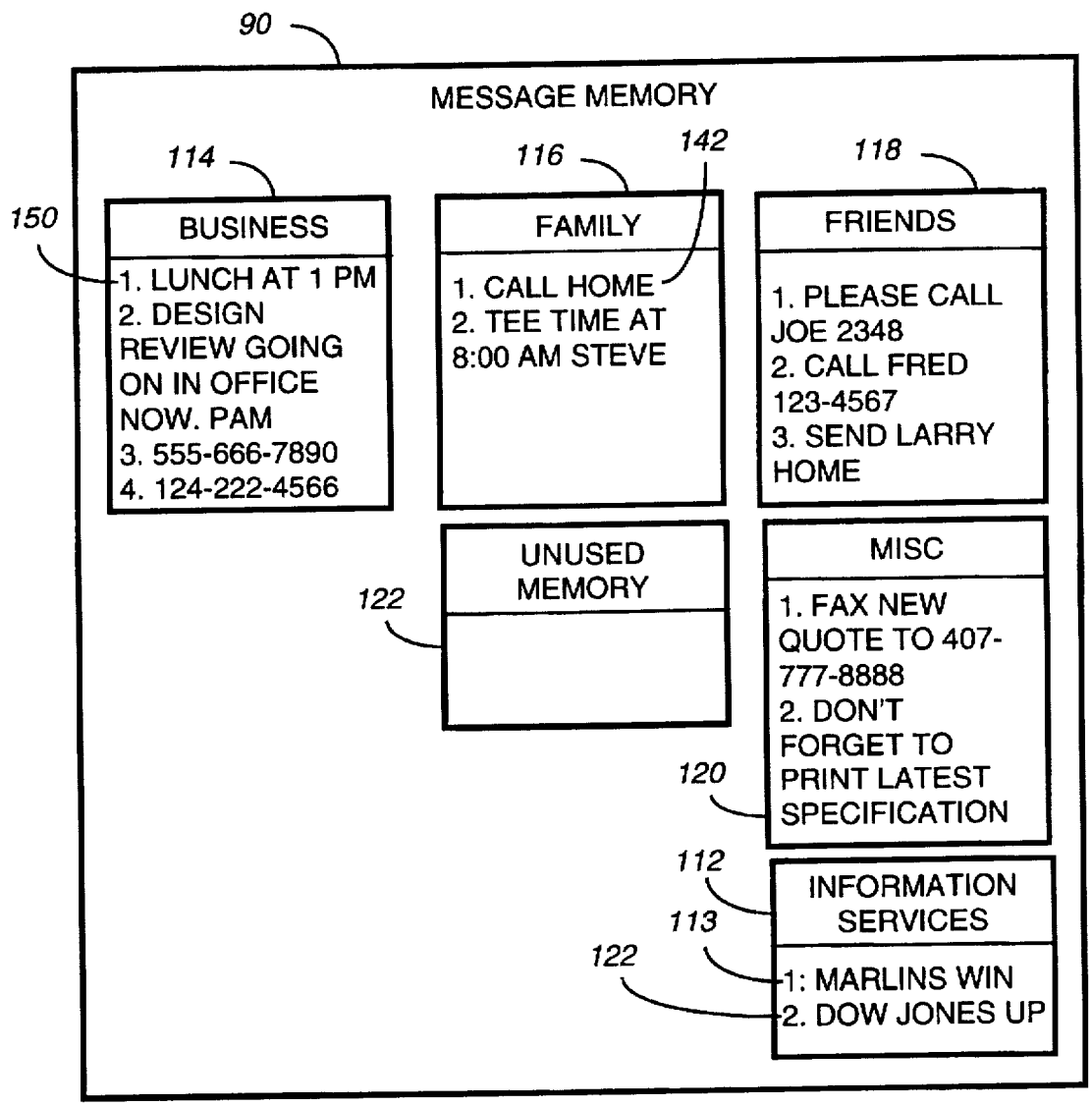
FIG. 7 illustrates how the pager's memory is arranged to store messages by categories.

The processor now compares the message's data to the list of identifying data in the family category, and a match is found (instruction 138) between "home" in the message and "home" in the identifying data. Accordingly, the next instruction 140 causes the contents of portion 38 of the message to be stored at 142 within location 116 (family) of message 90 (FIG. 7). Per the next instruction 144, an alert is generated signifying receipt of a family message.

As stated earlier, the header portions 36 of messages 30 and 32 are optional. The same is true for any message that is not an information services message. The inclusion of the header portion 36 is preferred in situations where it is practical to insert it because the pager need only look for a match between its stored identifying data the contents of the header. If the contents of the portion 38 must also be compared to the stored identifying data, more processing time is required. Hence, where a header is included, it is preferred to look only to the header to identify the category of the message. Where a header is not included, the contents of portion 38 are examined to determine the message's category. Even when a header is included, the processor may examine both the header 36 and portions 38 to determine the category of the message. This is the procedure followed in the program of FIGS. 5 and 6.

Referring back to FIG. 6, if the instruction 134 finds a match with a business message, it proceeds to instruction 146 and then to instruction 148 to store the message in memory under the business category and generate an alert signifying same. For example, if the message 32 is sent with "address 2" instead of "address 3", then instruction 134 finds a match between the telephone number "777-9823" and the same number stored under the business category (FIG. 4). The contents of portion 38 of the message are stored at 150 under the business category in memory 90 (FIG. 7).

Assuming now that a message is transmitted from someone in the friends category, the program would proceed to instruction 138 where no match would be found. The next instruction 151 compares the message to identifying data in the friends list (FIG. 4). If a match is found (instruction 153), the message is stored (instruction 155) in the friends memory location 118 (FIG. 7) and an alert is generated signifying the receipt of a message in the friends category (instruction 157).

If no match was found at instruction 153, the program proceeds to instruction 165 for storing the message in the miscellaneous memory location 120 (FIG. 7). A generic alertis then generated per instruction 167.

The forgoing example illustrates that any numeric or alphabetic text may be so stored. Telephone numbers and names of people who are uniquely associated with one of the categories are among the preferred identifying data to be stored.

It can be seen that the technique described above eliminates the need to assign one address for each information service that a pager is subscribed to. By sorting messages according to categories, a pager can be subscribed to multiple information services with a single address. Another address can be used for other messages from originators such as work, family, etc.

Figure 9:
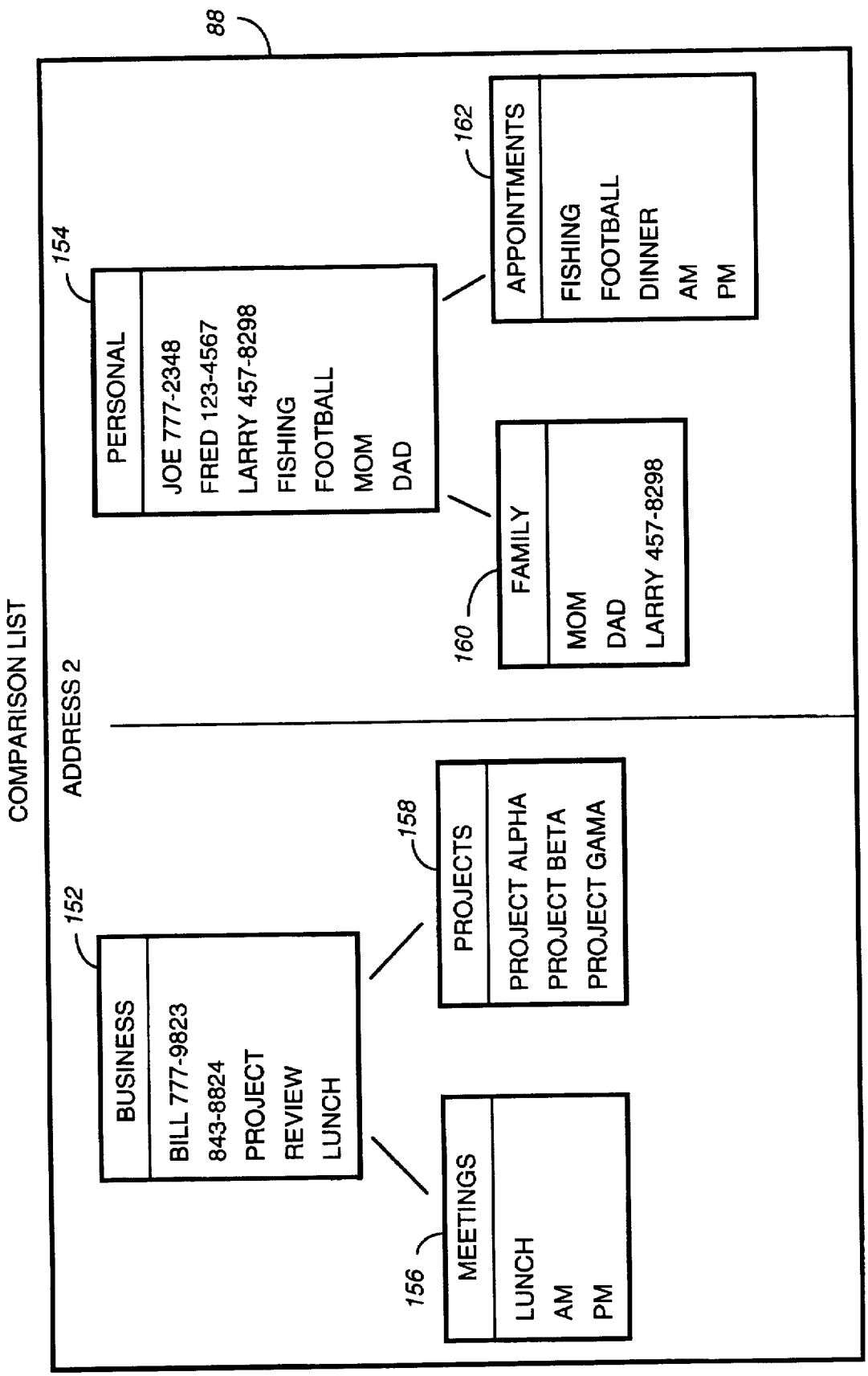
FIG. 9 shows an alternate comparison list that the pager of FIG. 3 may use to determine both categories and sub-categories of received messages.

According to another aspect of the invention, incoming messages are stored by categories and sub-categories in order to make it easier for the user to locate and display a particular message. To accomplish this, the comparison list 88 in the pager's RAM 84 is organized as shown in FIG. 9.

In the illustrated embodiment, the comparison list 88 shows two categories of messages, business 152 and personal 154. Each category is accessed under "Address 2". The pager will normally also have an information services category (such as the one shown in FIG. 4) that is accessible under "Address 1" or another address.

Referring to the business category 152, it is shown as including various items of identifying data, including names of people, telephone numbers, and words that are likely to be used in a business message.

Two sub-categories of business are shown, a sub-category 156 for meetings, and another sub-category 158 for projects. Each sub-category is shown with its own identifying data.

The personal category 154 also includes names, telephone numbers and words likely to be found in a personal messages.

Two sub-categories of the personal category are shown, a sub-category 160 for family, and another sub-category 162 for appointments, each having its own identifying data. Additional sub-categories may be added, including additional sub-categories for the business category 152, for the information services category 112 (FIG. 7), and for any other category.

Figure 10:
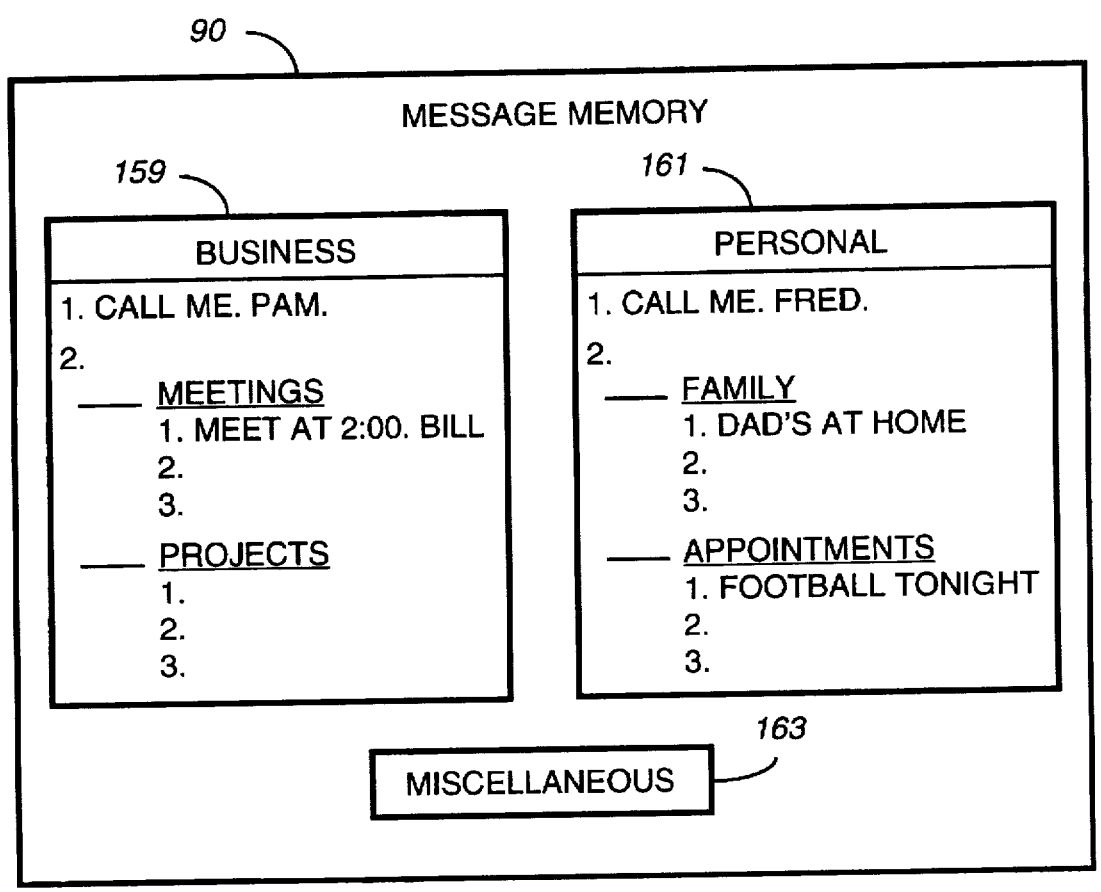
FIG. 10 illustrates how the pager's memory can be arranged to store messages by categories and sub-categories.

When a message is received that fits into one of the categories or sub-categories shown in FIG. 9, it is stored in message memory 90 which may be organized as shown in FIG. 10. As shown, message memory 90 has been re-organized to reflect the desire to store message by categories and sub-categories. Business messages are stored in memory location 159 which has sub-category locations for Meetings and Projects. Personal messages are stored in memory location 161 which has sub-category locations for Family and Appointments. A miscellaneous memory location 163 is provided for messages that do not fall under the Business or Personal categories.

Figure 11:
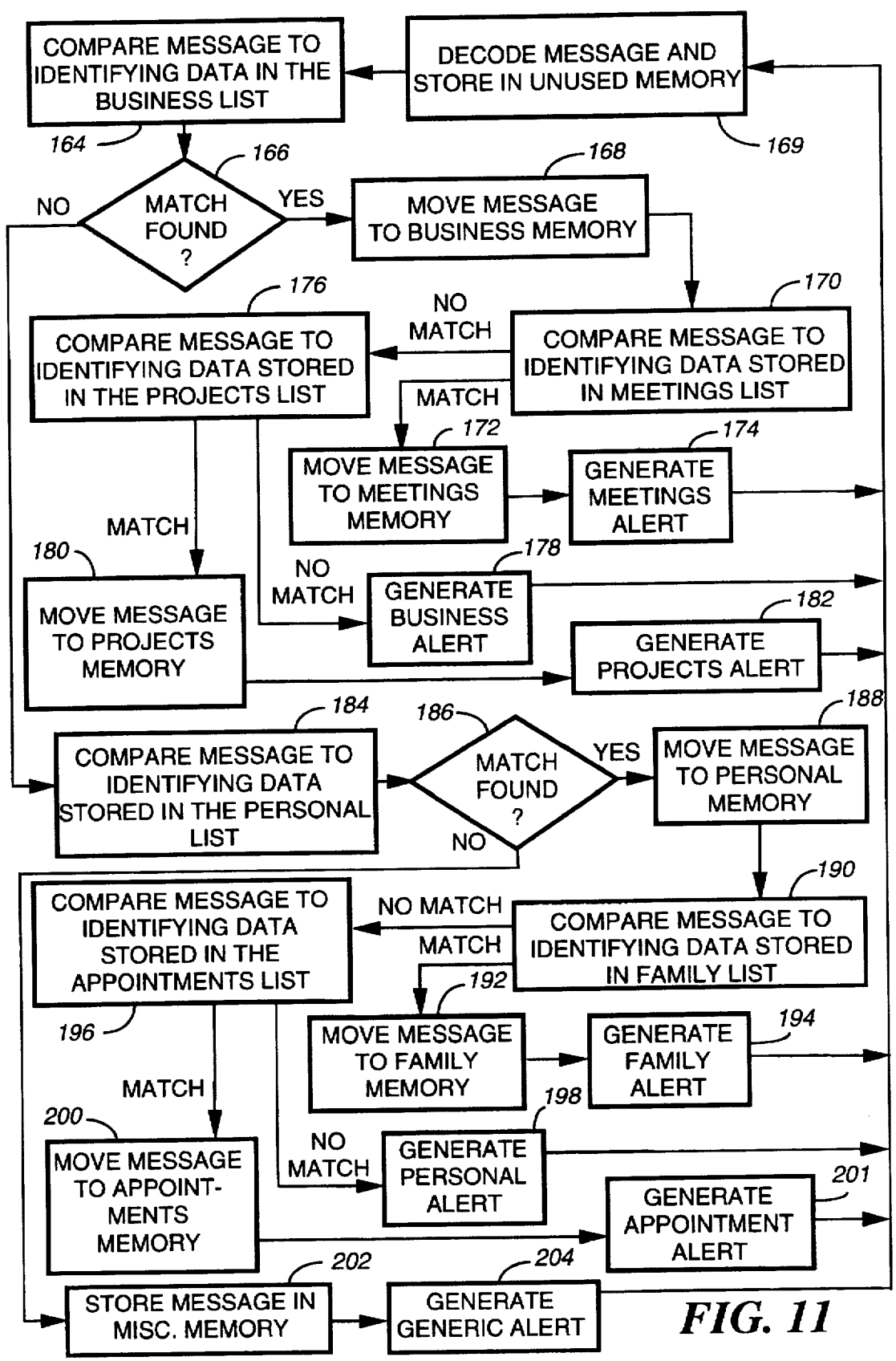
FIG. 11 is a flow chart that illustrates various modifications to the flow chart of FIG. 5 to adapt the pager to store messages by sub-category.

The sub-categories are accessed and used in accordance with instructions programmed into the processor 52. FIG. 11 shows those instruction in the form of a flow chart. These instructions illustrate the kind of modifications to the flow chart of FIGS. 5 and 6 that can adapt the pager to store messages by sub-categories.

It is assumed that a message has been transmitted with Address 2, that the pager 44 has detected a match with that address and that the message has been decoded and stored in an unused portion of the memory (instruction 169). Instruction 164 then causes the data in the received message to be compared to the identifying data in the business category 152 (FIG. 9). Assuming that the message includes the telephone number 843-8824, a match is found (instruction 166) with the same number in the identifying data in business category 152, and the entire message becomes stored in the pager's message memory 90 (FIG. 10) under the business category per instruction 168. It will remain there unless it becomes associated with one of the business sub-categories. If that same message included the statement "call me. Pam", that statement would be stored under the broad category of "business" because the text of the message does not match any identifying data in the sub-categories.

Instruction 170 causes the contents of the message to be compared to the identifying data stored in the meetings list 156 shown in FIG. 9. If the text of the message is "meet at 2 PM. Bill", a match is found with "PM", and the message is stored (instruction 172) in the message memory (FIG. 10) under the meetings sub-category, as indicated at message location 1 under the meetings sub-category. An alert is then generated (instruction 174) to signify that a meetings message has been received.

Referring back to instruction 170, if no match were found the next instruction 176 would cause the message to be compared to the identifying data in the Projects list 158. If no match is found, that means that no part of the message matched the identifying data in the Projects list 158 or the Meetings list 156. Hence, the message does not fit into one of the sub-categories; it will remain stored under the Business category, and a business alert is generated per instruction 178.

If the message is matched to identifying data in the Projects list 158, the program proceeds from instruction 176 to instruction 180 which causes the message to be stored in memory 90 under the Projects sub-category. A Projects alert is generated per instruction 182.

Now consider the case where a "Personal" type message is received. Instruction 166 will find no match, so the program proceeds to instruction 184 to look for a match with identifying data under the Personal category 154 (FIG. 9). If a match is found (instruction 186), the message is stored in memory 90 under the Personal category (instruction 188). To determine if the message fits in a sub-category, instruction 190 causes the message to be compared to the identifying data found in the Family list 160. If a match is found, the message is stored in memory 90 under the Family category (instruction 192) and a Family alert is generated (instruction 194).

If no match is found per instruction 190, the program proceeds to instruction 196 to look for a match with identifying data in the Appointments list. If no match is found, a Personal alert is generated per instruction 198. If a match is found, instruction 200 causes the message to be stored in memory 90 under the Appointments sub-category, and instruction 201 causes an Appointment alert to be generated.

Returning to instruction 186, a finding of no match signifies that the received message is neither in the Business category nor in the Personal category. Hence, the program proceeds to instruction 202 for storing the message in memory location 163 (FIG. 10) for miscellaneous messages, and then to instruction 204 for generating a generic alert.

Figure 12:
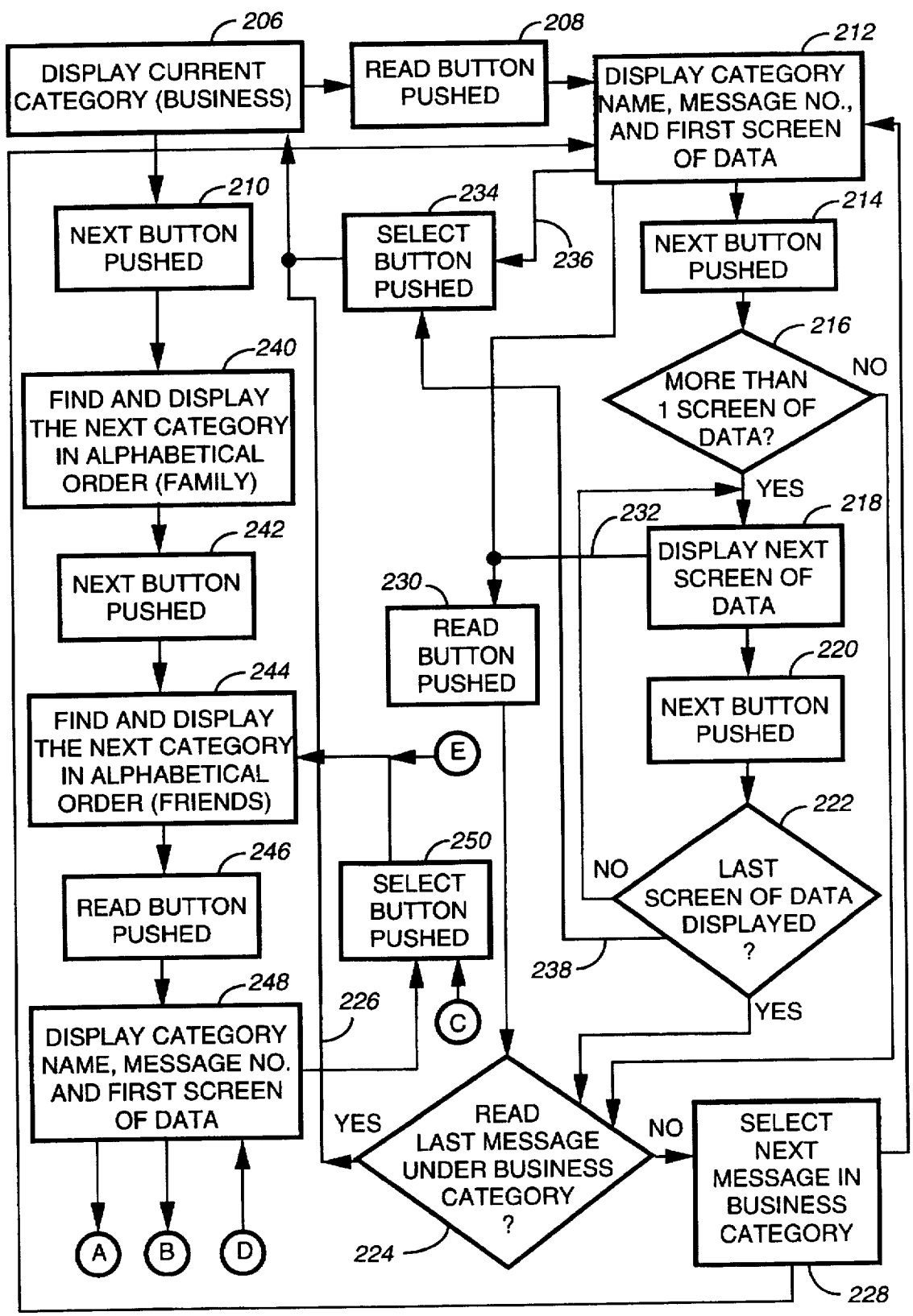
FIGS. 12 and 13 together constitute a flow chart illustrating how the pager is programmed to display a message along with an indication of the category of the displayed message.
Figure 13:
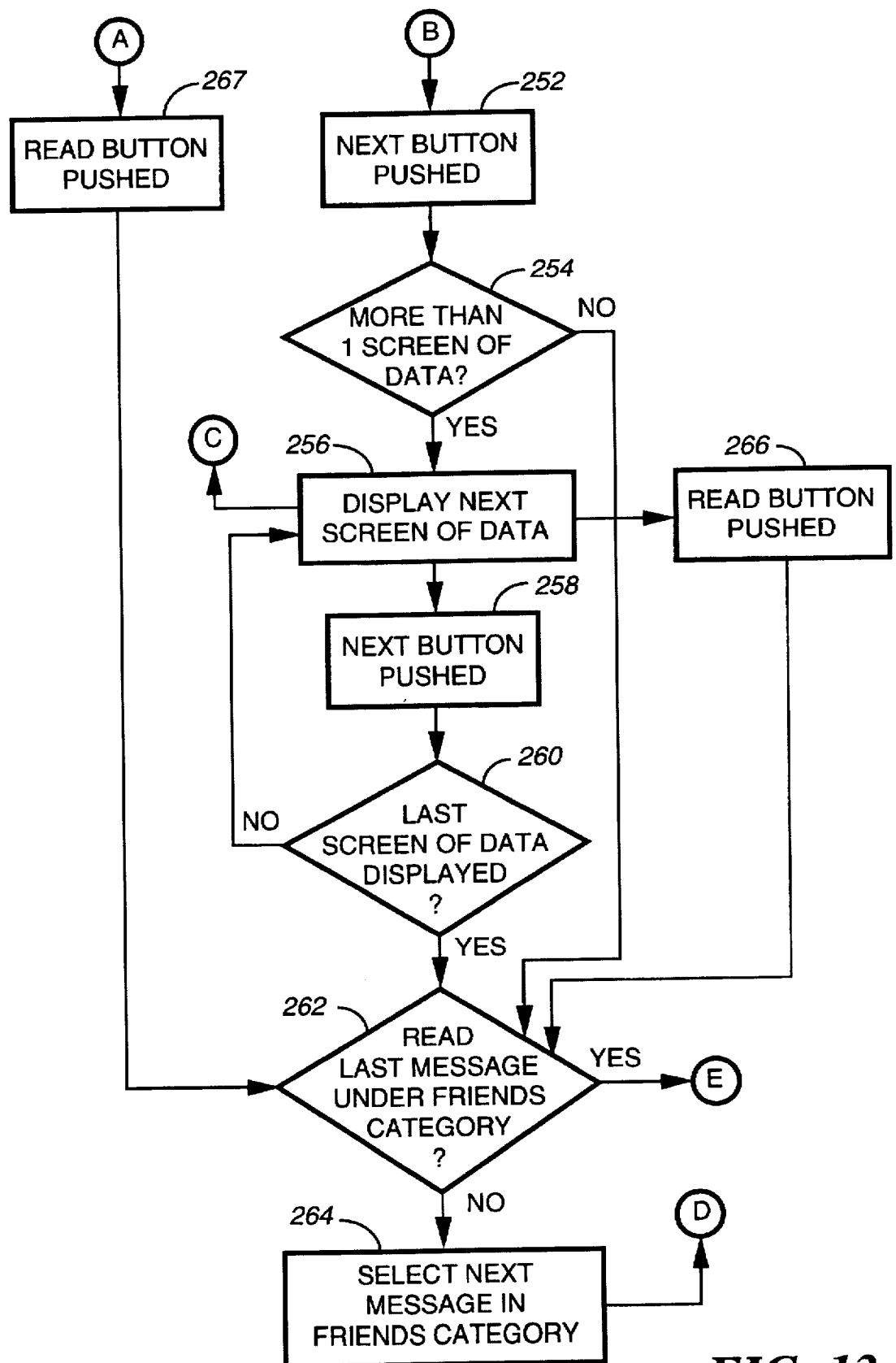

According to another aspect to the invention, each decoded message is displayed along with an indication of the category under which the displayed message has been stored. This is accomplished by appropriate programming of the processor 52 as shown by the flow chart in FIGS. 12 and 13, to which reference is now made.

Instruction 206 causes the pager 44 to display the current category of message which, in this example, is the business category. If the user desires to read a message stored under the business category, the Read button is pushed (step 208). On the other hand, if the user wishes to read a message under a different category, he pushes the Next button (step 210).

Assuming that the user wishes to read a message stored under the business category, the Read button will be pushed and the program proceeds to instruction 212 which causes the pager to display the name of the category, the message number, and the first screen of data. If, for example, the pager had stored the message as shown in FIG. 7, the display would now show the numeral one (indicating message number one) and the text of that message ("lunch at 1 P.M.").

If the content of the message is longer than can be displayed on the pager's display at one time, the rest of the message can be displayed as follows. When the user pushes the Next button again (step 214), instruction 216 asks whether the present message is longer than can be shown on the display. If the answer is yes, the program proceeds to instruction 218 to display the next screen of data. When the Next button is pushed again (step 220), instruction 222 asks if the last screen of data has been displayed for the message in question. If the answer is no, the program can loop through instructions 218 and 222 until all the text of the message has been displayed.

After the message has been completely displayed, the program proceeds from instruction 222 (or from instruction 216) to instruction 224 which determines whether the last of the business category messages has been read. If the answer is yes, the program proceeds via path 226 back to the first instruction 206. If the answer is no, the program proceeds to instruction 228 for selecting the next message within the business category. The program then loops back to instruction 212 for displaying the category name, the next message number, and the first screen of data for that next message.

At any time during the execution of instructions 212–228, the user can advance to the next message within the category merely by pressing the Read button. For example, after instruction 212 causes a message to be displayed, the user can press the Read button (step 230) to advance to the next message within that category via instructions 224 and 228. Path 232 from instruction 218 also permits the next message to be read and displayed by the user pressing the Read button and causing the program to advance to instructions 224 and 228.

The user can also exit this part of the program and select a different category by pressing the Select button (step 234). This causes the program to return to the first instruction 206 via path 236 from instruction 212, or via path 238 from instruction 222.

Referring back to instruction 206, pushing the Next button (step 210) would move the program to instruction 240 which causes the pager to find and display the next category in alphabetical order. In this example, the family category is next. Assuming that the user does not wish to read a message in the family category, pressing the Next button again (step 242) advances the program to instruction 244 which causes the pager to find and display the next category in alphabetical order (friends). To read a message in the friends category, the reader pushes the Read button (step 246), whereby the next instruction 248 causes the pager to display the name of the category, the message number and the first screen of data for the first message.

At this point the user can continue reading the present message and additional messages within the friends category, or the user can advance to the next category by pressing the Select button (step 250) and returning to instruction 244 for finding and displaying the next category in alphabetical order. If the Select button is not pushed, then the user can press the Next button (step 252) (FIG. 13) and advance the program to instruction 254 to determine whether there is more than one screen of data for the present message. If there is more than one screen of data, the program continues to instruction 256 for displaying the next screen of data. The user can continue advancing through the data for that message until it is completely displayed by continuing to press the Next button (step 258) to continue looping through instructions 260 and 256.

After the present message has been completely displayed, the program proceeds to instruction 262 to determine whether the last message has been read under this present (friends) category. If the answer is no, the program proceeds to instruction 264 to select the next message within the same category, and then back to instruction 248 (FIG. 12) to display the message. Advancing to the next message in this category can also be accomplished by the user pressing the Read button (step 266 or step 267) while the previous message was being displayed.

According to another aspect of the invention, the user may change the names of the categories by adding new categories, changing the names of existing categories, etc. by altering the contents of the memory. As discussed previously, the pager has at least one memory whose contents include the names of categories. The user control, and the programming of the processor 52, enable the user to change the contents of this memory, as illustrated in FIG. 14.

Figure 14:
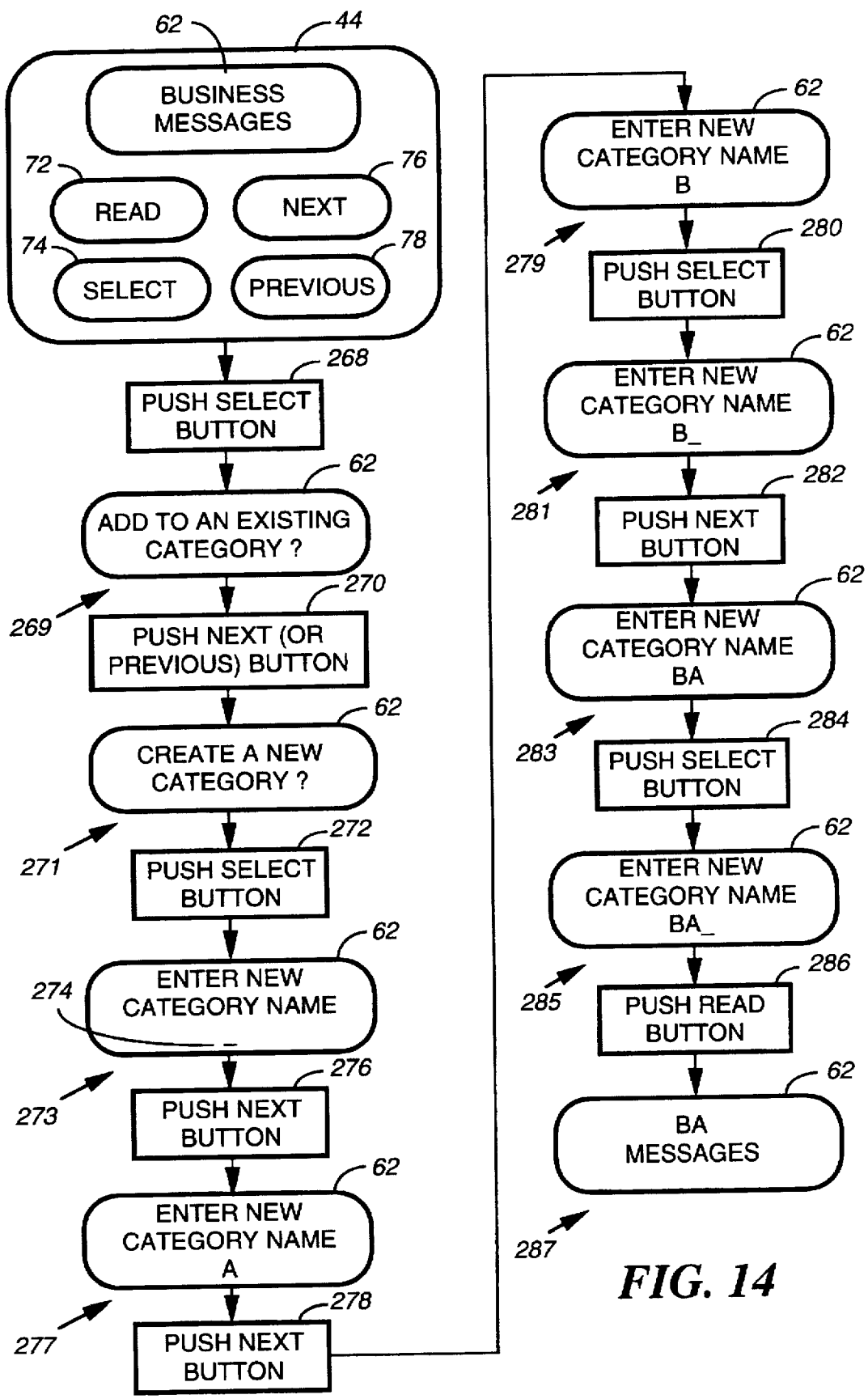
FIG. 14 is a flow chart showing a sequence of operations by which a user employs a user control on the pager to change names of categories and add new categories.

FIG. 14 shows the pager 44, its display 62, and a sequence of high level prompts that are programmed into the processor 52 using conventional programming techniques. The illustrated sequence starts with the pager displaying "Business Messages". The next step in the sequence involves the user pressing one of the buttons shown on the pager. The following step shows the pager's display 62 (not the complete pager) displaying a text prompt in response to the immediately preceding step. This sequence continues serially through FIG. 14.

In the illustrated example, it is assumed that the user wishes to create a new category called "BA". To start this process, the user pushes the Select button (step 268), the pager's display 62 changes, asking "Add to an existing category?" (step 269). In this example, the user does not wish to add a name to an existing category, but to name an entirely new category. Therefore, at step 270 the user pushes the Next button (or the Previous button) until the display shows the prompt "create a new category?" (step 271). When that prompt is present, the user responds in the affirmative by pushing the Select button (step 272). The display now prompts the user to enter a new category name (step 273), and shows a cursor 274 to indicate where a new letter may be inserted to start creating the new name. The user then pushes the Next button (step 276), causing the display to place the letter A in the place of the cursor 274 (step 277). At this point, the user may enter each letter of the new name using the Next and Previous buttons. The Next button is used to scroll forward in the alphabet; the Previous button is used to scroll backward. In this case, the user presses the Next button (step 278) to scroll forward, whereupon the A in the display changes to a B (step 279). Because the user wishes to use the letter B in the first name of the new category, the user now pushes the Select button (step 280). This action selects the letter B as the first letter in the new name, and the display then changes by moving the cursor to the right of the selected B to indicate the position of the next letter to be selected. At this point, the user can press the Next button (step 282) to scroll forward to show the letter A (step 283) on the display (alternately, the user may use the previous button to scroll backward through the alphabet to find the letter A again). Because the display now shows the letters BA which constitute the desired name of the new category, the user presses the Select button (step 284). The display then moves the cursor to the next position (step 285), but since all the desired characters have been selected, the user presses the Read button (step 286). This completes the entry of the name for the new category, and the display 62 shows (step 287) the new category name as the current category.

According to another aspect to the invention, the pager's processor 52 is responsive to the user control for changing the identifying data associated with a category or sub-category. This can be accomplished in a manner that is similar to the way category names were changed, as discussed in connection with FIG. 14. The technique which is used is shown in FIG. 15, to which reference is now made.

Figure 15:
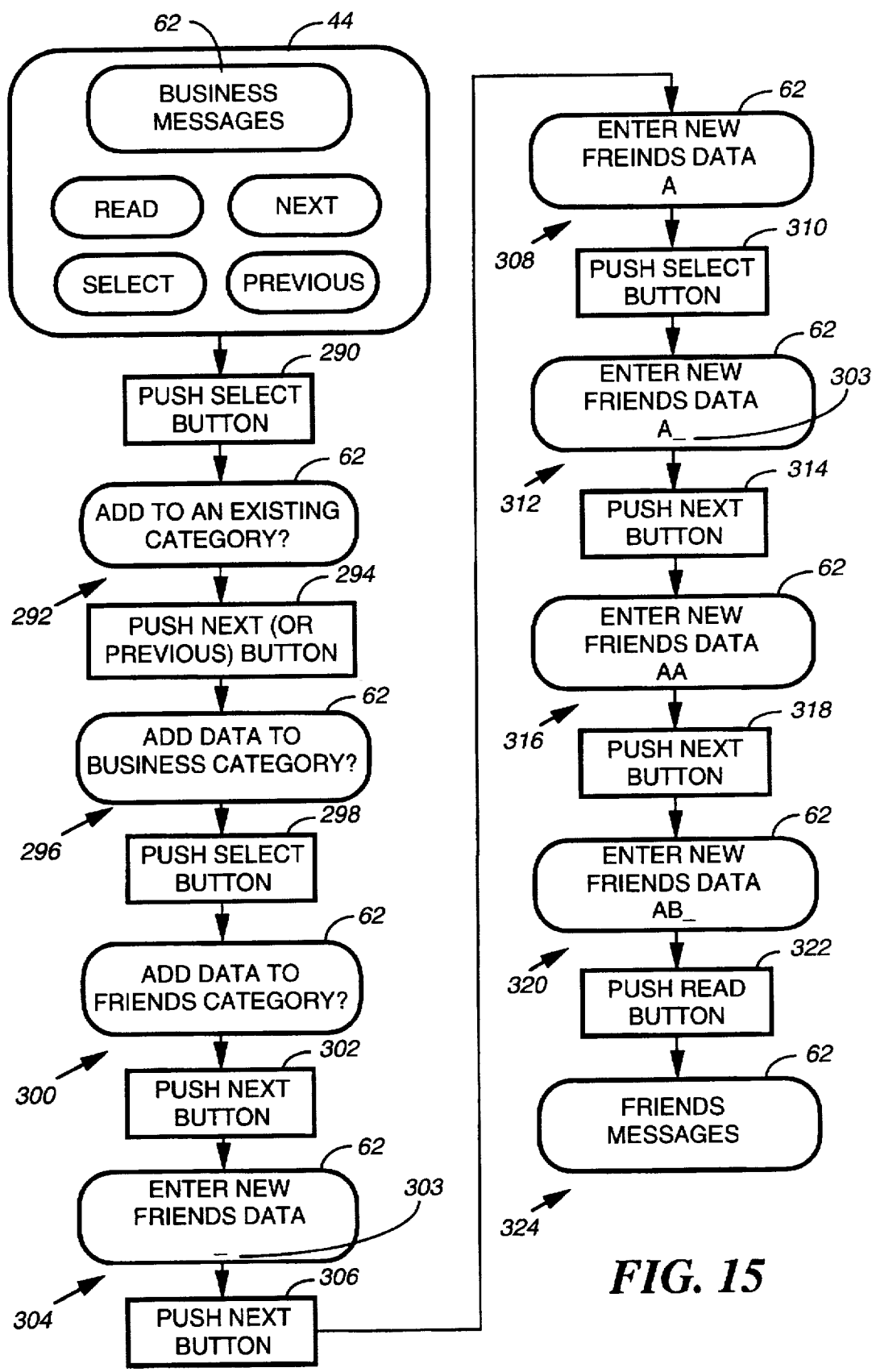
FIG. 15 is a flow chart showing a sequence of operations by which a user employs a user control on the pager to change identifying data associated with a category or sub-category.

As with FIG. 14, FIG. 15 starts with an illustration of the pager 44 with its Read, Select, Next, and Previous buttons, and its display 62 which is illustrated as showing the text "business messages". Selected ones of the illustrated buttons on the pager will be used to elicit text prompts on the display 62. The display 62 is shown in alternating sequence with the immediately preceding button actuation to which the display is responding.

The first step 290 involves the user pushing the Select button. This causes the display to show the prompt "Add to an existing category?" (step 292). Because the user does not wish to add a name to an existing category, the user pushes the Select button again (step 294) to scroll through to the prompt which asks whether the user wishes to add data to the business category (step 296). In this example, the user does not wish to add data to the business category, but rather to add data in the form of a new name AB to the list of names in the friends category. Referring briefly to FIG. 4 and the comparison list 88, this amounts to adding the name AB under the friends category which is shown as being accessible under Address 2.

Referring back to FIG. 15, the user does not wish to add any data to the business category, so he pushes the Next button (step 298). In response, the display shows "Add data to friends category?" (step 300). Since this is what the user wishes to do, he presses the Select button (step 302) and the display then says to enter the new friends data, and displays a cursor 303 to indicate where the first letter of the new data is to be inserted. The user then pushes the Next button (step 306) in order to start scrolling through the alphabet to select the first desired letter. At step 308, the display shows the results of the first actuation of the Next button by showing the letter A where the cursor 303 used to be. To choose the next letter, the user presses the Select button (step 310), whereupon the display now moves the cursor 303 to the right as shown in step 312. To scroll through the alphabet to locate the next letter, the user pushes the Next button (step 314), causing the display to show the letter A in the last position of the cursor 303 (step 316). To continue scrolling, the user presses the Next button again (step 318), and the display now shows the letter B in the second position (step 320). Because this is the desired name which the user wishes to enter in the friends category, the user pushes the Read button (step 322) to cause this name to be stored in memory. The display now shows the "Friends Messages" text (step 324) as the current category.

It will be appreciated that a number of advantages arise from the above described technique of categorizing messages. First, multiple information services can be subscribed to by a pager using a single address. Another address can be used for all other categories of messages.

Further, information in a stored message is more easily accessed because the user can call up and display only the messages in the category or sub-category in question. There is no need to scroll through several categories of messages to find a specific item of information.

Additionally, the user is made aware of the category of message that his pager has received by virtue of the corresponding alert that is generated. If the user is expecting an urgent family message, but the alert identifies a received message as information services, the user is promptly made aware of the fact that the received message is not the urgent message he was awaiting and need not read it immediately.

Further, the ability of the user to customize the names of categories and the identifying data for the categories makes the pager useful for a wide variety of users.

Although the invention has been described in terms of a preferred embodiment, it will be obvious to those skilled in the art that many modifications and alterations may be made without departing from the invention. Accordingly, it is intended that all such alterations and modifications be considered as within the spirit and scope of the invention as defined by the appended claims.

We claim:

1. In a selective call receiver having memory and receiving messages that are transmitted by a standard signaling protocol, a method of storing received messages that include data without modifying the standard signaling protocol, comprising at the selective call receiver:

receiving and decoding incoming messages;

providing a location in memory for storing received messages according to categories;

for each category, storing in memory an associated list of user-selected identifying data; and comparing data in a received message to the user-selected identifying data and, if a match is found, storing the received message in memory and under the category associated with the matching identifying data.

2. A method as set forth in claim 1, including generating a user alert upon receipt of a message, and wherein the alert is different for at least some categories of received messages.

3. A method as set forth in claim 1 including storing messages according to categories and sub-categories, and also storing identifying data associated with each sub-category.

4. A method as set forth in claim 1 wherein the identifying data includes telephone numbers.

5. A selective call receiver as set forth in claim 1 wherein the identifying data includes names of people.

6. A method as set forth in claim 1 wherein the selective call receiver has a memory containing names of categories, and including changing the content of the memory upon user demand.

7. A method as set forth in claim 1 including changing the list of identifying data upon user demand.

8. A method as set forth in claim 1 including displaying a stored message and an indication of the category under which the displayed message has been stored.

9. A method as set forth in claim 1 including storing in memory at least first and second addresses, the first address for receiving messages in an information services category, and the second address for receiving messages in at least a second, different category.

10. In a selective call receiver having memory and receiving messages that are transmitted by a standard signaling protocol, a method of storing received messages that include data without modifying the standard signaling protocol, comprising at the selective call receiver:

receiving incoming messages;

storing in memory at least first and second addresses to which the receiver will respond, the first address for receiving messages in an information services category and the second address for receiving messages in at least a second, different category;

providing a location in memory for storing received messages according to categories;

for at least one category, storing in memory an associated list of user-selected identifying data;

comparing data in a received message to the user-selected identifying data and, if a match is found, storing the message in memory and under the category associated with the matching identifying data; and displaying a stored message and an indication of the category under which the displayed message has been stored.

11. A selective call receiver, comprising:

circuitry for receiving incoming messages that include data;

at least one memory for storing received messages according to categories and, for at least one category, storing an associated list of user-selected identifying data;

means for a user to input identifying data to the memory;

a processor coupled to the memory and being programmed to compare data in a received message to the user-selected identifying data and, if a match is found, to cause the received message to be stored in the memory under the category associated with the matching identifying data; and a display for displaying stored messages.

12. A selective call receiver as set forth in claim 11, further including user controls coupled to the processor for selecting a category of messages to be displayed, and wherein the processor is further programmed to respond to the user controls by causing display of one or more messages in a selected category.

13. A selective call receiver as set forth in claim 11, including means for generating a user alert upon receipt of a message, a characteristic of the user alert being dependent on the category of the received message.

14. A selective call receiver as set forth in claim 11, including a user control, wherein the content of the at least one memory includes names of categories, and wherein the processor is programmed to respond to the user control for changing the content of the memory.

15. A selective call receiver as set forth in claim 11 wherein the selective call receiver receives only messages having predetermined addresses stored in the memory, and wherein the memory stores at least first and second addresses, the first address for receiving messages in an information services category, and the second address for receiving messages in other categories.

16. A selective call receiver as set forth in claim 11 wherein the memory stores messages according to categories and sub-categories, and stores identifying data associated with each sub-category.

17. A selective call receiver as set forth in claim 11 wherein the identifying data associated with categories includes telephone numbers.

18. A selective call receiver as set forth in claim 11 including a user control, and wherein the processor is responsive to the user control for changing the identifying data.

19. A selective call receiver, comprising:

circuitry for receiving incoming messages that include data;

at least one memory for storing at least first and second addresses to which the receiver will respond, the first address for receiving messages in an information services category and the second address for receiving messages in at least a second, different category, the memory also storing received messages according to categories and, for at least one category, an associated list of user-selected identifying data;

means for a user to input identifying data to the memory;

a processor coupled to the memory and being programmed to compare data in a received message to the user-selected identifying data and, if a match is found, to cause the received message to be stored in the memory under the category associated with the matching identifying data;

a display; and a user control coupled to the processor for selecting a category of messages to be displayed, the processor being responsive to the user control for causing the display to show one or more messages in the selected category.

20. A selective call receiver as set forth in claim 19, including means for generating a user alert upon receipt of a message, a characteristic of the user alert being dependent on the category of the received message.

21. A selective call receiver as set forth in claim 19 wherein the memory also stores messages according to sub-categories, and stores identifying data associated with each sub-category.

* * * * *